Oct. 3, 1944.            S. R. ENBERG                2,359,411
                          DRESSING TOOL
              Filed Sept. 16, 1942         3 Sheets-Sheet 1
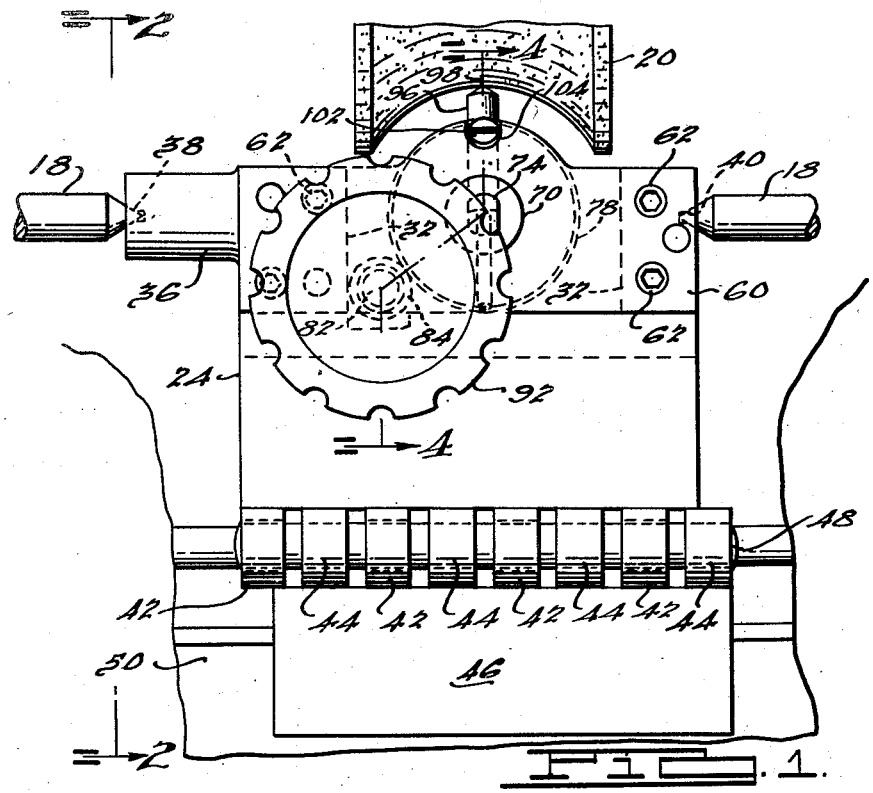
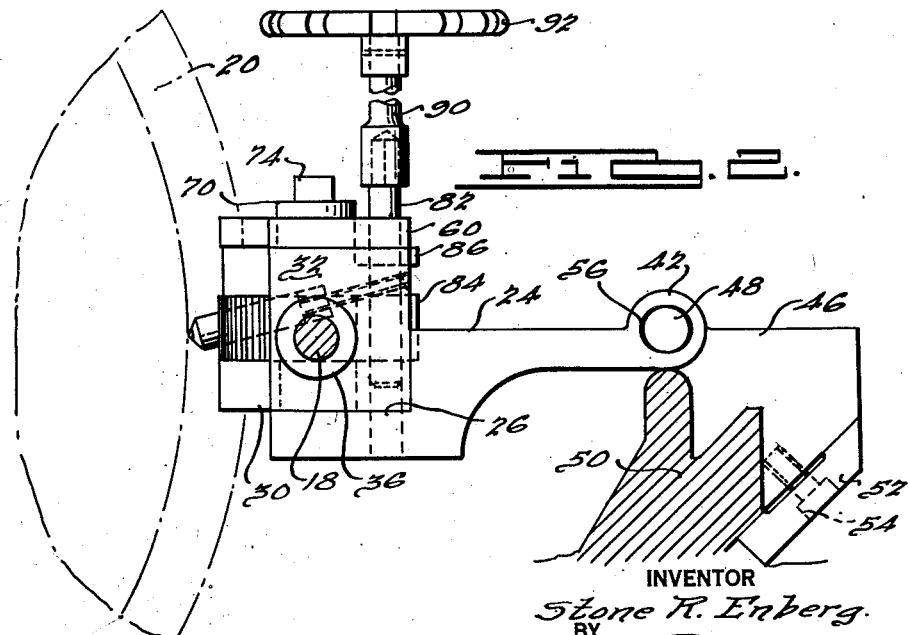
INVENTOR
Stone R. Enberg.
BY
Harness, Dickey & Pierce
ATTORNEYS.

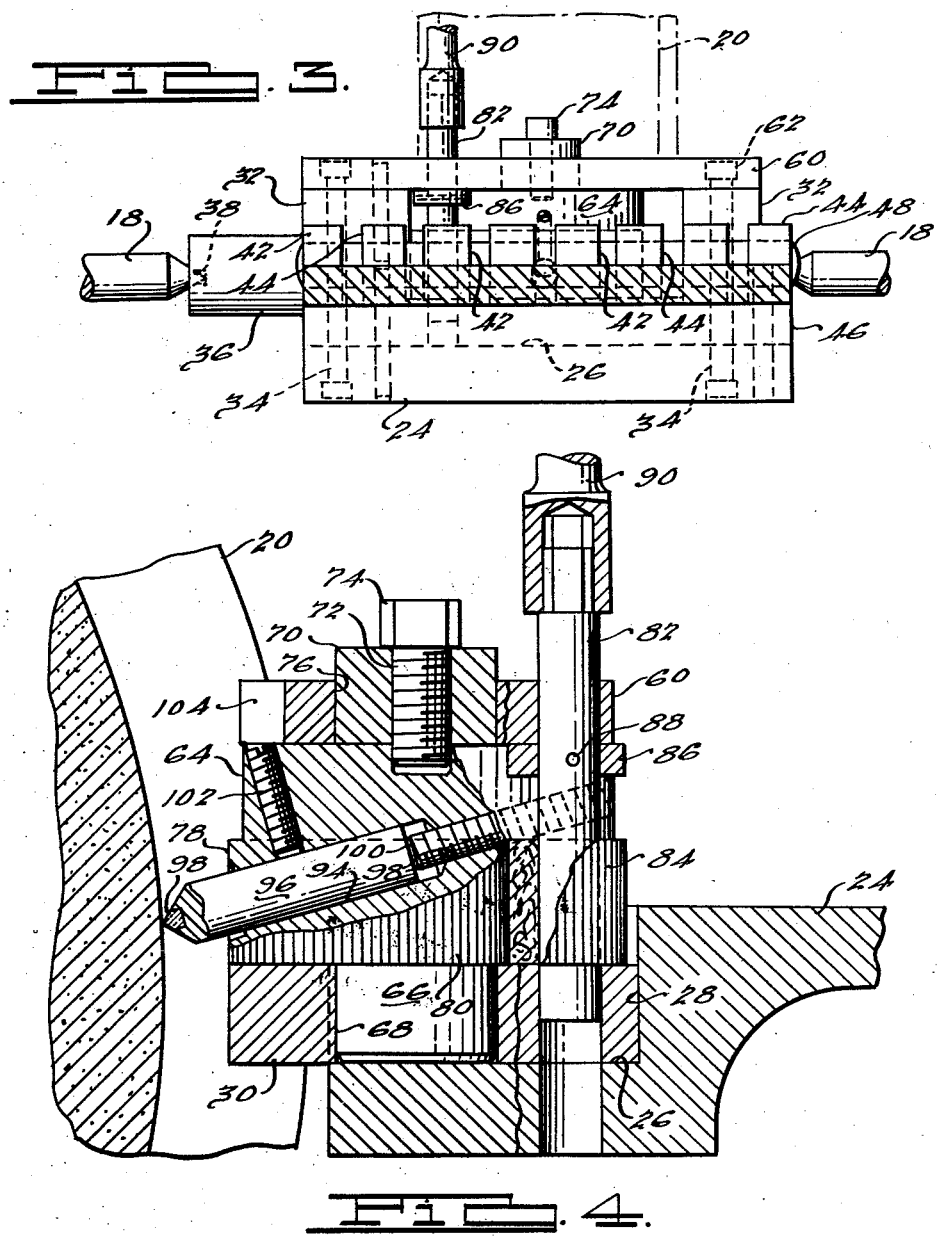

Oct. 3, 1944.  S. R. ENBERG  2,359,411
DRESSING TOOL
Filed Sept. 16, 1942  3 Sheets-Sheet 3
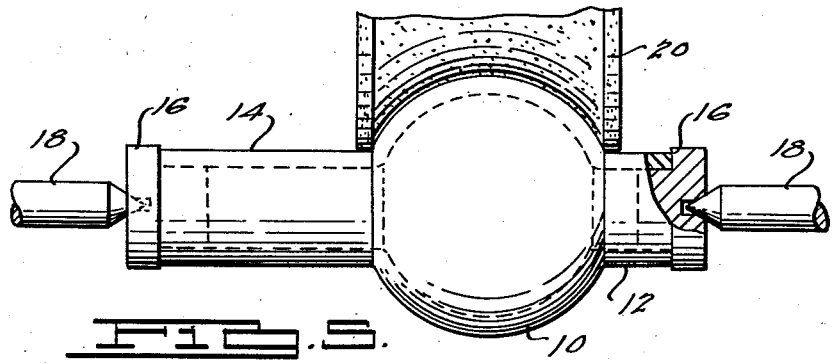
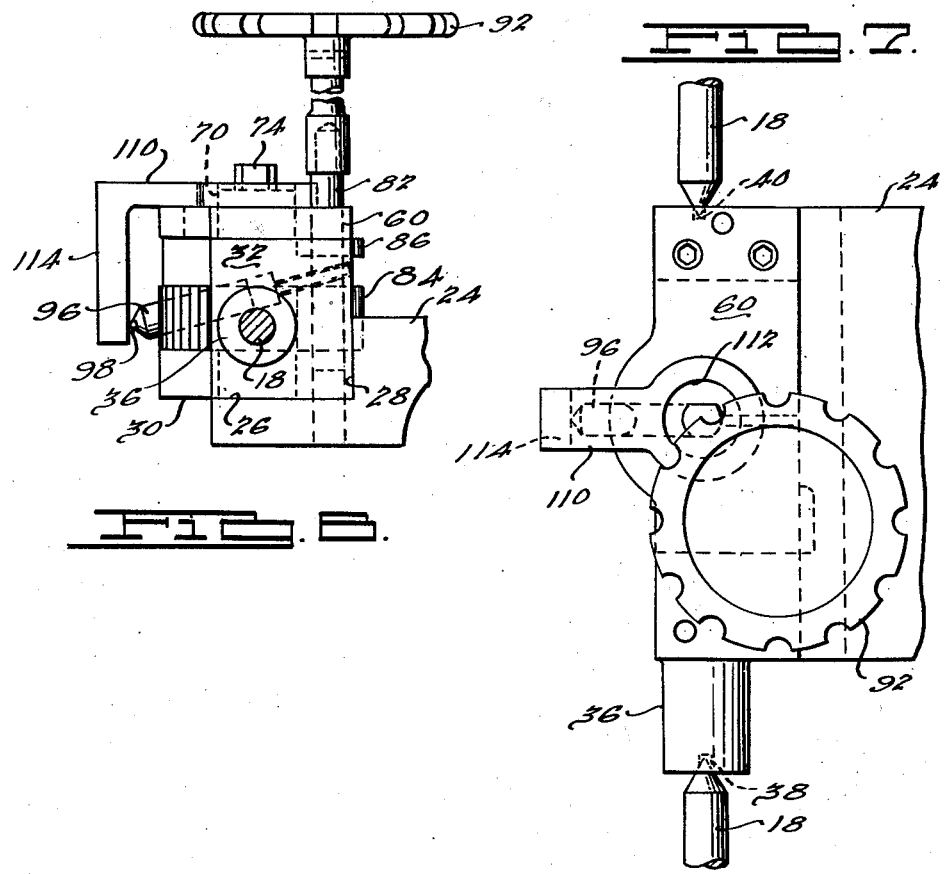
INVENTOR
Stone R. Enberg.
BY
Harness, Dickey & Pierce
ATTORNEYS.

Patented Oct. 3, 1944

2,359,411

UNITED STATES PATENT OFFICE 2,359,411

DRESSING TOOL

Stone R. Enberg, Grosse Pointe Woods, Mich., assignor to Ainsworth Manufacturing Company, Detroit, Mich., a corporation of Michigan Application September 16, 1942, Serial No. 458,511

7 Claims. (Cl. 125—11)

This invention relates to dressing tools and has for its principal object the provision of a dressing tool for forming a partially circularly sectioned groove in the periphery of a grinding wheel and in predetermined relation with respect to work holding the centers associated therewith.

Objects of the invention include the provision of a grinding wheel dressing tool capable of being mounted between the same centers of a grinding machine as are employed for supporting the work and operable when so supported to dress the grinding wheels into exact complementary relationship with respect to that portion of the surface of the work desired to be ground thereby; the provision of a construction as above described including a novel form of means for maintaining the dressing tool in its desired relation with respect to the grinding wheel about such centers; the provision of a construction as above described in which the point of the dressing tool is mounted for oscillatory movement about a definite center whereby to enable it to dress a groove of partially circular conformation in the peripheral face of the grinding wheel; the provision of a grinding wheel dressing tool as above described in which a novel form of means is employed for mounting and swinging the point of the dressing tool; the provision of a construction as above described including a part adapted to be fixed to the work supporting carriage of the grinding machine and hingedly connected to the remaining portion of the device through a joint permitting relative movement of one with respect to the other axially of the hinge joint to facilitate the mounting of the tool between the work carrying centers of the grinding machine; the provision of a construction as above described in which such pivotal joint permits both axial and lateral movement of the connected parts but maintains the part against relative vertical movement at the hinge joint; and the provision of a tool of the type described providing a novel and accurate means for locating a gaging device for setting the cutting point of the tool.

The above being among the objects of the present invention the same consists in certain novel features of construction and combinations of parts to be hereinafter described with reference to the accompanying drawings, and then claimed, having the above and other objects in view.

In the accompanying drawings which illustrate a suitable embodiment of the present invention and in which like numerals refer to like parts throughout the several different views, Fig. 1 is a plan view of my improved grinding wheel dressing tool shown operatively mounted in a grinding machine, fragments of which are shown to illustrate the relative positions thereof;

Fig. 2 is an end elevational view of the grinding wheel dressing device shown in Fig. 1 and taken as looking in the direction of the arrows 2—2 in Fig. 1;

Fig. 3 is a rear elevational view of the grinding wheel dressing tool shown in the preceding views;

Fig. 4 is an enlarged fragmentary, vertical sectional view taken on the line 4—4 of Fig. 1 and illustrating the construction of the grinding wheel dressing tool in greater detail;

Fig. 5 is a fragmentary, partially broken, partially sectioned plan view illustrating a typical form of workpiece intended to be ground by a grinding wheel dressed by use of the grinding wheel dressing tool of the present invention;

Fig. 6 is a fragmentary end elevational view of the grinding wheel dressing tool of the present invention illustrating a gauging tool for the cutting point thereof operatively associated therewith; and, Fig. 7 is a plan view of the structure shown in Fig. 6.

The purpose of the present invention is the provision of a grinding wheel dressing tool for dressing a grinding wheel which is to grind a partially spherical surface of a workpiece and to dress it in such a manner that it will not only be accurately formed but will be accurately located as well with respect to such surface of the workpiece when the latter is thereafter mounted in the grinding machine. The workpiece is assumed to have center holes for receiving the centers between which it is adapted to be supported in the grinding machine and about which it is adapted to be rotated during the grinding operation. In other words and as illustrated in Fig. 5 the workpiece there shown as illustrative of the general type of work in connection with which the present invention may be employed consists of a hollow member having a partially spherical portion 10 and oppositely directed coaxial trunnion portions 12 and 14, respectively, whose axes intersect the center of the ball portion 10. The trunnion portions 12 and 14 are shown as being of unequal length. The workpiece being hollow, in order to enable it to be supported between centers, a shouldered plug 16 is removably inserted in each end thereof and each plug is provided with a center hole for receiving the corresponding center 18 so as to support the workpiece for rotation about the axes of the trunnions 12 and 14. The centers 18 will, of course, be supported upon the slide, or the like, of an associated grinder and one of them will be rotatably driven and the workpiece will be caused to rotate therewith in any suitable or conventional manner as, for instance, by means of a dog, not shown. The other center 18 will be non-rotating but will be axially movable toward and from the remaining center so as to enable the insertion and removal of work from between the centers, all in the conventional manner.

The dressing tool is made of the same length as the workpiece illustrated in Fig. 5, including the centering plugs 16 at each end thereof so that, when the work is removed from between the centers 18, the work may be replaced by the dressing tool without the necessity of changing the axial position of the rotating center 18 and without changing the tail stock for the non-rotating center. When the dressing tool is thus supported between the centers 18 and operated to dress the associated grinding wheel 20, the periphery of the grinding wheel will be formed into exactly complementary relationship with respect to the desired cross-sectional conformation of the exterior surface of the ball portion 10 of the work and in the same position longitudinally between the centers 18 as it is desired to form the ball portion 10 on the work.

The dressing tool consists of a main body portion 24 having a downwardly stepped forward marginal edge portion forming a shelf-like surface 26 and a perpendicular rear wall 28. Received upon the shelf 26 and in abutting relationship with respect to the wall 28 is a member 30 which extends laterally across the same and is provided with upstanding end portions 32. Screws 34, indicated in Fig. 3, project up through the main body portion 24 and thread into the member 30 for the purpose of rigidly securing it in place. One end 32 of the member 30 is provided with a laterally extending boss-like projection 36 provided with a center hole 38 for reception of the lefthand center 18, as viewed in Figs. 1 and 3, and the righthand portion 32 is provided directly in its outer face with a center hole 40 for reception of the remaining center 18. When the member 30 is positioned with the centers 18 in the center holes 38 and 40, respectively, as illustrated, it will be appreciated, and as indicated in Fig. 1, that the upwardly projecting end portions 32 of the member 30 are similarly located with respect to the side faces of the grinding wheel 20 on opposite sides thereof. The distance between the center holes 38 and 40 is equal to the distance between the center holes in the plugs 16 when operatively received in the work as illustrated in Fig. 5, so that it will be appreciated that the device of the present invention may be inserted between the centers 18 in place of a piece of work without requiring any changes whatever in the mountings of the centers 18.

In order to prevent the main body portion 24 and member 30 from rotating about the centers 18 when operatively mounted between the centers 18, the rear edge of the main body portion 24 is formed to provide a plurality of laterally spaced aligned eye portions 42 between each pair of which is positioned one of a plurality of similarly spaced and aligned eye portions 44 formed along the forward edge of a member 46, a hinge or pivot pin 48 being projected through all of the eye portions 42 and 44 so as to hingedly connect the main body portion 24 and the part 46 together.

The part 46 is adapted to be rigidly fixed to the slide or other part of the grinding machine upon which the centers 18 are mounted and to move bodily therewith. In the broader aspects of the invention the securement of the part 46 to such slide or other part may be accomplished in any suitable or convenient manner but for the purposes of illustration it is assumed that such slide or the like in the present case is provided with a way structure illustrated generally at 50 in Figs. 1 and 2 which the lower face of the member 46 is formed to fit and to which it is rigidly clamped by means of a clamping plate 52 and one or more screws 54.

The eye portions 42 are spaced from each other longitudinally of the pivot pin 48 by a distance greater than the thickness of the eye portions 44, and the pin 48 is held against relative axial movement in the eye portions 44 and is axially slidably associated with the eye portions 42 so that the main body portion 24 and parts carried thereby may slide axially on the pin 48 within the limits of axial clearance between the eye portions 42 and 44. Additionally, the holes in the eye portions 42 while of the same vertical dimension as the diameter of the pin 48 so as to prevent relative vertical movement between the eye portions 42 and 44 are widened in a horizontal plane so as to provide a clearance, indicated at 56 in Fig. 2, between the pin 48 and the sides of the holes in the eye members 42, which clearance permits a limited amount of bodily shiftable movement of the main body member 24 and parts carried thereby toward and from the grinding wheel 20. The reasons for providing this limited amount of horizontal shifting movement of the main body portion 24 as above described is so that in mounting the main body portion 24 between the centers 18 it may shift forwardly or rearwardly in order to insure that the centers 18 will accurately and fully seat in the corresponding center openings 38 and 40 in the member 30 which is fixed with respect to the main body member 24.

From the description thus far given it will be appreciated that when the dressing device is not in use it may be pivotally swung back about the axis of the pin 48 so as to lie out of interfering relation with respect to the work which is to be supported in the centers 18, and that when it is desired to dress the grinding wheel 20 it may be swung into the position illustrated in the drawings until the center holes 38 and 40 thereof are aligned with the centers 18 and the centers 18 may be advanced relative to one another to engage the main body portion 24 between them. During such movement of the centers, because of the axial clearance between the eye portions 42 and 44 the main body portion 24 may shift axially of the centers 18 not only to permit its insertion between them but to permit both centers to be fully seated therein. It will also be appreciated that in mounting the main body portion 24 between the centers 18 it may shift horizontally because of the clearance 56 previously described to permit full and complete seating of the centers 18 and that because of the absence of any vertical clearance between the pin 48 and the eyes 42, when main body portion 24 is mounted between the centers 18 no relative rotational movement of the device about the axes of the centers 18 may occur.

A diamond point is employed for removing material from the grinding wheel 20 and it is mounted in the device thus far described in the following manner. A plate member 60 extends between and overlies the upper ends of the upwardly projecting end portions 32 of the member 30 and is rigidly fixed thereto as by means of screws 62. The plate 60 thus cooperates with the member 30 to provide a recess in which, as best brought out in Fig. 4, a circularly sectioned wheel or roller 64 is received. The axial length of the roller 64 is substantially equal to the distance between the plate 60 and the upper surface of the member 30 between the end portions 32 thereof and is thus held against relative vertical movement. The roller 64 is provided with an axially concentric integral trunnion 66 on its lower face which is rotatably received in a complementary opening 68 in the member 30. A trunnion member 70 is fixed to the upper face of the roller 64 in concentric relation with respect to the trunnion 66 and the roller 64 and is rigidly secured thereto by means of a screw 72 having a round head 74 projecting vertically above the upper surface of the trunnion member 70 and flattened off on opposite sides for wrench receiving purposes. The trunnion member 70 is rotatably received in an opening 76 formed in the plate 60 and projects above the plate 60 as shown. Thus the roller 64 is mounted for rotation about a vertical axis and is maintained against axial movement between the member 30 and the plate 60. The lower portion of the roller 64 is increased in diameter as indicated at 78 and its peripheral surface is serrated as at 80. It is to be noted that the axis of the roller 64 lies in intersecting relation to a line connecting the center holes 38 and 40.

Beyond the periphery of the roller 64 a shaft 82 is located with its axis in parallelism with the axis of rotation of the roller 64 and extends between and has suitable bearings in the plate 60 and in the member 30. Between these last-mentioned members the shaft 82 is provided with a roller 84 fixed thereto and of such diameter that it frictionally engages the serrated surface of the enlarged portion 78 of the roller 64. Preferably the roller 84 is made of a suitable yieldable material such as leather or the like into which the serrations 80 of the roller 64 may be impressed or imbedded, and the diameter of the roller 84 is such as to cause the serrations 80 to be impressed or imbedded thereinto so as to eliminate any possibility of slippage between the roller 84 and the roller 64 when the shaft 82 is rotated. The shaft 82 is held against axial movement with respect to the device by engagement of the roller 84 with the upper face of the member 30 and by means of a collar 86 pinned to the shaft 82 as at 88 and bearing against the under-face of the plate member 60.

The upper end of the shaft 82 projects above the plate 60 and is there formed for non-rotatable reception of the lower end of a shaft 90, the upper end of which has non-rotatably fixed thereto a hand wheel 92 providing a means whereby the roller 84 may be manually rotated. It will be noted that the diameter of the roller 84 is materially less than the diameter of the portion 78 of the roller 64 so that a reduction in the ratio of movement between the hand wheel 92 and the roller 64 is provided for the purpose of permitting more accurate control of the diamond point which will hereinafter be described.

It may be noted that both the forward edges of the member 30 and of the plate 60 are forwardly extended into conformance with the shape of the forward edge of the roller 64 so as to give it complete support over the entire area of its end surfaces, as well as to provide suitable clearance between the device and the grinding wheel without detracting from the proper support of the diamond dresser.

The diamond dresser is carried by the roller or a wheel 64 and as best illustrated in Fig. 4 for this purpose a hole is formed through the wheel or roller 64 and passes centrally through the same but its axis is disposed at an angle, preferably approximately 15 degrees, with respect to a plane perpendicular to the axis of the roller 64. The outer end of this hole is enlarged as indicated at 94 for close but slidable reception of the diamond point element which includes a cylindrical metallic body 96 terminating at its outer end in a diamond point 98. The inner end of this hole which is indicated at 98 is of smaller diameter than the outer end 94 thereof and is threaded for threadable reception of the adjusting screw 100 which in bearing against the rear end of the body 96 of the diamond point serves to limit rearward movement of the latter in the forward end 94 of the hole. A set screw 102 is threaded down through the upper surface of the roller 64 in perpendicular relation to the axis of the diamond point for the purpose of locking the diamond point in its axially adjusted position. The forwardly extending portion of the upper plate 60 is centrally notched as at 104 so as to expose the upper end of the set screw 102 for manipulation when rotatably aligned therewith. The hole 94, 98 is arranged with its axis upwardly inclined with respect to a line passing through the center of the grinding wheel and the diamond point 98 for well known practical reasons and such hole is located vertically in the roller 64 so that when the diamond dressing element projects from the roller 64 the required distance its point lies substantially in a plane including the axis of rotation of the grinding wheel 20 and the axes of the centers 18.

In practice the effective end of the diamond point 98 is so adjusted relative to the axis of the roller 64 that its radial distance from such axis is exactly equal to the radius of curvature of the desired spherical surface of the work to be formed. Assuming that a piece of work such as indicated in Fig. 5 is being ground by the grinding wheel 20 and it becomes necessary to redress the periphery of the grinding wheel 20 to maintain the accuracy of the ground surface, and during which grinding operation the main body portion 24 and parts carried thereby have been swung in a clockwise direction as viewed in Fig. 2 about the axis of the pivot pin 48 so as to lie to the right of the latter out of interfering relation with respect to the work. Assuming the work as having been removed from between the centers 18, the main body portion 24 and parts carried thereby are then swung in a counter-clockwise direction about the axis of the pin 48 until the center holes 38 and 40 are brought into alignment with the centers 18. Assuming that the lefthand center is the rotatable and axially fixed center in this case the hole 38 is then socketed upon such left center 18 by shifting the main body portion 24 bodily to the left as viewed in Fig. 1, upon which the remaining axially shiftable but non-rotatable center 18 is seated in its corresponding center hole 40 to thus mount the tool between the centers 18. The slide or other support for the centers 18 is then moved relative to the axis of the grinding wheel 20 until the diamond point 98 is in position to engage the periphery of the grinding wheel 20 upon which the hand wheel 92 is rotated to cause the diamond point 98 to traverse the periphery of the grinding wheel 20 in the desired path of curvature to dress the same, the relative advancement of the tool with respect to the grinding wheel being repeated as the diamond point 98 is thus caused to travel in the circular path until the periphery of the grinding wheel has been properly re-dressed. Such stops or other means for limiting the relative movement between the grinding wheel and the work as may be employed in any case are, of course, adjusted during such dressing operation for well understood reasons. After the periphery of the grinding wheel 20 has thus been properly dressed the axially movable center 18 is backed off to release the dressing device from between the centers 18 whereupon it is swung in a clockwise direction of rotation about the axis of the pivot pin 48 and the operation of grinding work may then be resumed.

As previously explained it will be appreciated that inasmuch as the distance between the center holes 38 and 40 and at least the distance between the axis of the roller 64 and the center hole for the axially stationary center 18 is exactly equal to the corresponding dimensions of the work as illustrated in Fig. 5 with the plugs 16 inserted therein, each time the grinding wheel 20 is dressed by the diamond point 98 the relation between the center of curvature of the peripherally grooved grinding wheel and the axially fixed center 18 will be identical to that required for subsequent grinding operations on the work. The re-dressing of the periphery of the grinding wheel thus automatically re-locates the surface dressed at the exact location required for grinding the pieces of work which are subsequently mounted between the centers 18 and eliminates any need for re-locating the centers and the grinding wheel axially relative to each other after each dressing operation.

In order to initially locate the diamond dressing element 96, 98 with respect to the axis of rotation of the roller 64, to test it for location after locking it in position and/or for re-locating it whenever necessary, a novel form of gauge is provided in accordance with the present invention and the dressing fixture is specially formed for cooperation therewith. As previously noted and as particularly brought out in Figs. 2, 3 and 4 the trunnion member 70 projects above the upper face of the plate 60 and the upper face of the plate 60 is, of course, perpendicular to the axis of rotation of the roller 64 and trunnions 66 and 70, and this feature is utilized for locating the gauging fixture for the diamond dressing element 96, 98. This gauging fixture, as brought out in Figs. 6 and 7, comprises an angularly shaped element having a horizontally directed upper arm 110 provided with a flat lower face adapted to lie in flat contacting relation with respect to the upper face of the plate 60 and provided with a bore 112 therein for close reception of the upwardly projecting end of the trunnion member 70, this feature thus locating the gauging member accurately with respect to the axis of the roller 64. The gauging member also includes a downwardly projecting integral outer end portion 114 and the plane of the inner face thereof is located from the axis of the bore 112 by the same radial dimension which it is desired for the surface 10 of the finished workpiece. It will be appreciated that in utilizing this gauging element for locating the diamond point 98 the fixture is first backed away from the grinding wheel 20, the gauging element is mounted upon the upwardly projecting end of the trunnion member 70 and the portion 114 thereof is swung into intersecting relation with respect to the path of movement of the diamond dressing element 96, 98 in the hole 94 of the roller 64. The set screw 102 is loosened and the adjusting screw 100 is then adjusted until when the gauging element is swung about the axis of the trunnion member 70 it just contacts the tip of the diamond point 98 at which point the set screw 102 is threaded inwardly to lock the diamond dressing element in its adjusted position. The gauging element is then removed with the assurance that the point of the diamond 98 is located at the required distance from the axis of rotation of the roller 64.

Having thus described my invention, what I claim by Letters Patent is:

What is claimed is:

1. In a grinding machine of the class wherein a part is provided with a relatively axially fixed center and a relatively axially movable center between which a piece of work is adapted to be supported for engagement with a grinding wheel and in which said grinding wheel and part are relatively movable toward and away from one another, the combination with said part and centers of a member adapted for mounting between said centers, a grinding wheel dressing element movably mounted on said member, means carried by said member for effecting movement of said dressing element with respect to said member, a second member fixed with respect to said part, and a pivotal connection between said members mounting said first-mentioned member for movement about an axis parallel to a line connecting said centers, said connection affording relative shifting movement of the first-mentioned member on the second-mentioned member axially of said connection to permit socketing of said first-mentioned member on said axially fixed center and affording limited lateral shifting movement of said first-mentioned member relative to said second-mentioned member.

2. In a grinding machine of the class wherein a part is provided with a relatively axially fixed center and a relatively axially movable center between which a piece of work is adapted to be supported for engagement with a grinding wheel and in which said grinding wheel and part are relatively movable toward and away from one another, the combination with said part and centers of a member adapted for mounting between said centers, a grinding wheel dressing element movably mounted on said member, means carried by said member for effecting movement of said dressing element with respect to said member, a second member fixed with respect to said part, and a pivotal connection between said first-mentioned member and said second-mentioned member including a plurality of eyes fixed with respect to said first-mentioned member and a plurality of eyes fixed with respect to said second-mentioned member and a pivot pin extending through all of said eyes, the eyes of one of said members being spaced from each other axially of said pivot pin by a distance greater than the width of the eyes of the other of said members whereby to permit shifting of one of said members axially of said pin with respect to the other of said members.

3. In a grinding machine of the class wherein a part is provided with a relatively axially fixed center and a relatively axially movable center between which a piece of work is adapted to be supported for engagement with a grinding wheel and in which said grinding wheel and part are relatively movable toward and away from one another, the combination with said part and centers of a member adapted for mounting between said centers, a grinding wheel dressing element movably mounted on said member, means carried by said member for effecting movement of said dressing element with respect to said member, a second member fixed with respect to said part, and a pivotal connection between said first-mentioned member and said second-mentioned member including a plurality of eyes fixed with respect to said first-mentioned member and a plurality of eyes fixed with respect to said second-mentioned member and a pivot pin extending through all of said eyes, the eyes of one of said members being spaced from each other axially of said pivot pin by a distance greater than the width of the eyes of the other of said members whereby to permit shifting of one of said members axially of said pin with respect to the other of said members and the openings for said pin in the eyes of one of said members being widened in a plane including the axis of said pivot pin and said centers when said device is mounted between said centers whereby to permit a limited amount of lateral shifting movement of said first-mentioned member with respect to said second-mentioned member.

4. A grinding wheel dressing device comprising, in combination, a part having center openings in opposite faces thereof, a roller rotatably mounted on said part for movement about an axis intersecting a line connecting the centers of said center openings and perpendicular thereto, a dressing element carried by said roller and movable therewith, means for rotating said roller, a second part adapted to be fixed to an associated grinding machine, a plurality of eyes fixed with respect to each of said parts and a pivot pin projecting through said eyes for pivotally connecting said parts, the eyes of one of said parts being of a width less than the spacing between the eyes of the other of said parts whereby said parts are relatively shiftable with respect to each other axially of said pivot pin, and the openings in the eyes of one of said parts being of a greater width in a plane including the axis of said pivot pin and said center openings than the diameter of said pivot pin whereby a limited amount of lateral play is provided between said parts transversely of said pivot pin.

5. A grinding wheel dressing device comprising, in combination, a part having center holes in opposite end faces thereof, a grinding wheel dressing element mounted for movement in a predetermined path upon said part, a second part adapted to be fixed to an associated grinding machine, a plurality of eyes fixed with respect to each of said parts and a pivot pin projecting through said eyes for pivotally connecting said parts, the eyes of one of said parts being of a width less than the spacing between the eyes of the other of said parts whereby said parts are relatively shiftable with respect to each other axially of said pivot pin, and the openings in the eyes of one of said parts being of a greater width in a plane including the axis of said pivot pin and said center openings than the diameter of said pivot pin whereby a limited amount of lateral play is provided between said parts transversely of said pivot pin.

6. In a grinding wheel dressing device, in combination, a member having a top wall and a bottom wall, a carrying member interposed between said walls, a lower trunnion on said carrying member rotatably mounted in said lower wall and an upper trunnion on said carrying member rotatably received in said upper wall and projecting upwardly therebeyond, a grinding wheel dressing element adjustably carried by said carrying member, a gaging element rotatably received on the upwardly projecting end portion of said upper trunnion, and a downwardly projecting end on said gaging member positionable in intersecting relation with respect to the path of adjustment of said dressing element relative to said carrier member.

7. In a grinding wheel dressing device, in combination, a member having spaced upper and lower walls, a second member received between said walls, a trunnion on the lower end of said second member rotatably received in said lower wall, a trunnion secured to said second member projecting upwardly through said top wall and rotatably received therein, a grinding wheel dressing element mounted on said second member with its axis disposed transversely with respect to the axis of rotation thereof about said trunnions, means for longitudinally adjusting said element in said second member, a gaging element having a flat face adapted for engagement with the upper face of said upper wall and having an opening therein closely receiving the upwardly projecting end of said upper trunnion therein, a downwardly projecting end portion on said gaging element swingable into intersecting relation with respect to the path of adjustment of said dressing element in said second member, and means for locking said dressing element in longitudinally adjusted position.

STONE R. ENBERG.